United States Patent
Voloschenko et al.

(10) Patent No.: US 7,031,067 B2
(45) Date of Patent: Apr. 18, 2006

(54) HEAD-UP DISPLAY

(75) Inventors: Dmitry Voloschenko, Schaumburg, IL (US); Zili Li, Barrington, IL (US); George T. Valliath, Buffalo Grove, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/797,701

(22) Filed: Mar. 10, 2004

(65) Prior Publication Data

US 2005/0200962 A1    Sep. 15, 2005

(51) Int. Cl.
   *G02B 27/14*    (2006.01)
(52) U.S. Cl. .......................... 359/630; 359/13
(58) Field of Classification Search ........ 359/630–634, 359/13, 14; 345/7, 9; 349/11
   See application file for complete search history.

(56) References Cited

U.S. PATENT DOCUMENTS

| | | | |
|---|---|---|---|
| 3,632,181 A | 1/1972 | Lee | |
| 4,902,082 A | 2/1990 | Okabayashi et al. | |
| 5,044,709 A | 9/1991 | Smith et al. | |
| 5,162,928 A * | 11/1992 | Taniguchi et al. | ............. 359/13 |
| 5,214,413 A | 5/1993 | Okabayashi et al. | |
| 5,410,371 A | 4/1995 | Lambert | |
| 5,748,377 A * | 5/1998 | Matsumoto et al. | ........ 359/633 |
| 5,864,432 A | 1/1999 | Deter | |
| 5,892,598 A | 4/1999 | Asakawa et al. | |
| 5,999,281 A | 12/1999 | Abbott et al. | |
| 6,278,538 B1 | 8/2001 | Schleipen | |
| 6,359,737 B1 * | 3/2002 | Stringfellow | ............... 359/631 |
| 6,476,944 B1 | 11/2002 | La Russa | |
| 2002/0027678 A1 | 3/2002 | Halldorsson et al. | |

FOREIGN PATENT DOCUMENTS

| | | |
|---|---|---|
| EP | 0 724 174 A1 | 7/1996 |
| EP | 1037088 A2 | 9/2000 |
| EP | 0 891 887 B1 | 10/2003 |
| JP | 05127022 A | 5/1993 |
| WO | WO 03/100517 A2 | 12/2003 |

OTHER PUBLICATIONS

Weihrauch, M. et al.: "The First Head Up Display Introduced by General Motors", SAE The Engineering Society For Advanced Mobility Land Sea Air and Space, SAE Technical Paper Series 890288, International Congress and Exposition, Detroit, Michigan, Feb. 27-Mar. 3, 1989, pp. 55-62.

(Continued)

*Primary Examiner*—Hung Xuan Dang
*Assistant Examiner*—Joseph Martinez
(74) *Attorney, Agent, or Firm*—Brian M. Mancini; Thomas V. Miller

(57) ABSTRACT

A head-up display includes an image source, such as a laser scanner, a means for diffusing light and a transparent element that can include a holographic element. The laser scanner emits a visible light for generating an image. The means for diffusing light receives the visible light from the laser scanner to project the image thereon, and preferably apply gain thereto. The transparent element produces a virtual or a real image of the image from the means for diffusing light. In a vehicle, the head-up display is configured to reflect the image into the vehicle to provide a virtual image ahead of a driver.

19 Claims, 3 Drawing Sheets

OTHER PUBLICATIONS

Kato, Hiroshi et al.: "Development of Hologram Head-Up Display", SAE The Engineering Society For Advanced Mobility Land Sea Air and Space, SAE Technical Paper Series 920600, International Congress and Exposition, Detroit, Michigan, Feb. 24-28, 1992, pp. 21-27.

Sugita, Masaya et al.: "Head-UP Display Using a Hologram as an Optical Element", SAE The Engineering Society For Advanced Mobility Land Sea Air and Space, SAE Technical Paper Series 920741, International Congress and Exposition, Detroit, Michigan, Feb. 24-28, 1992, pp. 49-56.

* cited by examiner

HEAD-UP DISPLAY

FIELD OF THE INVENTION

This invention is generally directed to the field of visual displays, and specifically to a head-up display.

BACKGROUND OF THE INVENTION

Head-up displays for an automotive or aircraft environment have been in use for several years. A continual effort has been applied to reduce size, weight, cost, number of optical and electronic components, and, at the same time, to improve both brightness and contrast in these head-up displays. Typically, a head-up display (HUD) will project light from an imaging device, such as a cathode ray tube display or liquid crystal display, where an image is created in an intermediate plane, from where it further gets projected towards the windshield through either refractive or reflective projection optics.

In an attempt to reduce size/cost of the head-up display, a diffusion film with extra imaging optics, both placed between the display source and a reflective optical element, were introduced. Such approach indeed allowed for a decrease in size of the display source (e.g., LCD) to some extent, however, at the expense of both needed additional imaging optical elements placed between the display source and the diffuser, and the undesired increase in an optical path between the display source and windshield. Not only does this add cost, this adds either extra weight/size to an already over-constrained in dash-space in a vehicle or aircraft.

Another approach uses an infrared laser source and a non-linear crystal both for infrared light conversion to visible and for light diffusion purpose in the intermediate image plane. Non-linear crystals are both prohibitive cost-wise to be employed in an HUD and have very low (a few percent) conversion efficiency. The approach has practical limitations as to get conversion efficiencies from infrared to visible light of more than ten percent, using a typical non-linear crystal (KDP) with the length of the order of one centimeter, the infrared light intensities of the order of 10 MWt/cm$^2$ are needed. To achieve that, a tight focusing of the laser beam on the crystal is required, which, in turn, superimposes a strict requirement on the value of the allowable deviation angle from the direction of phase-matching condition (i.e. a few milliradians).

Another approach uses a holographic element for imaging. However, this approach uses a complicated 'real-time' two-beam re-construction of the hologram imbedded into a windshield that would be difficult and costly to implement in practice.

What is needed is an apparatus is a display that employs a diffuser that brings about light diffusion into a needed cone with gain, without the requirement for extra imaging optical elements between the display source and the diffuser, to allow for the implementation of simpler and more compact optics.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, wherein:

DETAILED DESCRIPTION OF THE PREFERRED EMBODIMENT

The present invention provides a head-up display that incorporates a control element (e.g., a film) with a defined gain and exiting light cone angle from the intermediate image plane of the HUD. Placing a pre-defined gain diffusion/light control film in the intermediate image plane allows one to control the image quality of a virtual head-up display through the properties of the control film element. Preferably, the display incorporates a miniature laser scanner-based light source (e.g., such as developed by Symbol Technologies). However, other sources are envisioned for use in the present invention. In addition, a substantially transparent element such as a windshield, fixed screen, or movable screen, with or without a holographic element, can be incorporated to provide a virtual image that appears farther in distance than would normally be available with a direct image.

The implementation of the control element provides a means to directionally diffuse light with gain, which substantially decreases the complexity, size, and weight of the either refractive or reflective projection optics elements that follow in the optical path. The control film element can be either passive (e.g. a hologram written and replicated in a dichromated gelatin or polymer, or a replicated diffractive micro-optic grating type, e.g. manufactured by Reflexite) or active (e.g. an electrically switchable element). Preferably, a value of the gain of the control element can be adjusted. The introduction of the control element makes the design of a laser scanner-based head-up display practical for implementation.

Figure 1:
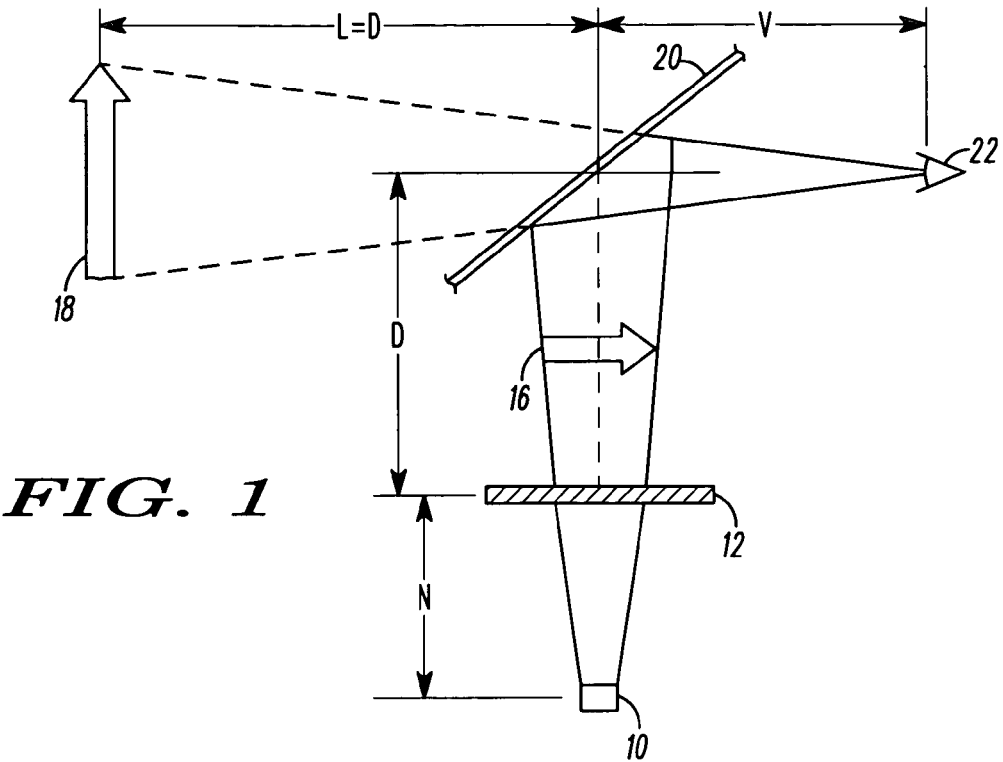
FIG. 1 is a cross sectional view of a first embodiment of a head-up display, in accordance with present invention.

FIG. 1 is a cross-sectional view of a first embodiment of a head-up display (HUD) in accordance with the present invention. The head-up display is shown containing a plurality of elements optically coupled along an optical path. The display includes an image source 10, a means for diffusing light 12, and a substantially transparent element 20 (i.e. windshield). The image source 10 emits a visible light for generating an image 16. The means for diffusing light 12 receives the visible light from the miniature laser scanner 10 to project the generated image thereon to the windshield 20. A virtual image 18 is created by providing reflection of the generated image from the windshield 20 to an interior of the vehicle.

In this embodiment, the image source 10 is a miniature laser scanner that produces a raster scan of the image 16 in either an interlaced or progressive scan mode as is known in the art. In effect, the laser scanner writes the image to the diffuser element 12 to generate the image. The laser scanner contains electronics and miniature optical elements as are commonly known in the art for miniature laser scanners, and will not be described herein.

In one configuration, the diffuser element 12 has dimensional extent of about fifteen centimeters (this extent depends on the angular orientation of the laser scanner 10 with respect to the plane of the diffuser 12), of any shape including round or rectangular. The scanner 10 is located at a distance, N, of about twenty-four centimeters from the diffuser element 12. The diffuser 12 is plastic and is located at a distance, D, of about one hundred and fifty centimeters from the windshield 20. A user is expected to be located within a range, V, of about sixty to ninety centimeters from the windshield. Although the geometry shown shows the scanner, diffuser elements in a straight perpendicular configuration, it should be recognized that the optical path of these components can be angled or folded by many means, such as by including mirrors, and that these different configurations are encompassed by the present invention.

In this embodiment, a virtual image 18 can be visualized at a distance, L=D, of about one hundred and fifty centimeters ahead of the driver of the vehicle 22.

Preferably, the means to diffuse the light 12 is a diffusing element that provides optical gain for the image 16 thereon. For a better light uniformity, a Fresnel lens can be incorporated with the diffuser element. The higher the gain provided by the diffuser element, the smaller the exit cone of light from the diffuser element. In practice, gains of from two to one-hundred can be easily provided from the diffuser. Gains of about fifty-seventy times, along the perpendicular axis of the diffuser are preferred. The use of gain provides a much bright image along the optical path for the driver 22 of the vehicle.

Figure 2:
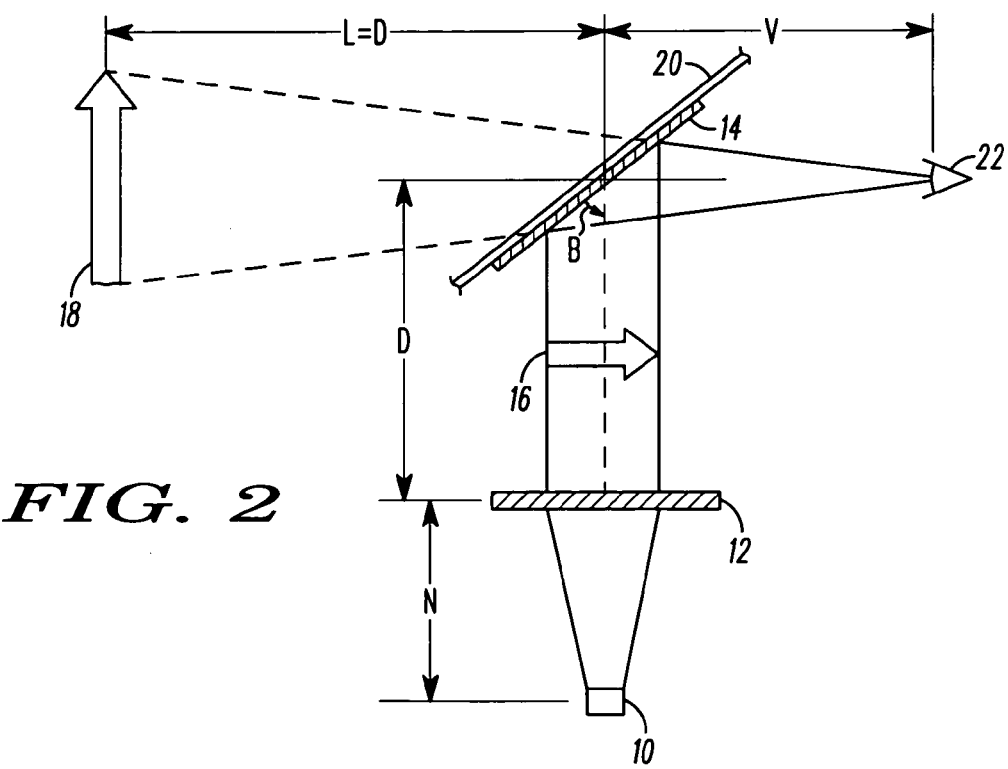
FIG. 2 is a cross sectional view of a second embodiment of a head-up display, in accordance with the present invention.

FIG. 2 is a cross-sectional view of a second embodiment of a head-up display (HUD) in accordance with the present invention. The head-up display is shown containing a plurality of elements optically coupled along an optical path. The display includes an image source 10, a means for diffusing light 12, and a holographic element 14. The image source 10 emits a visible light for generating an image 16. The means for diffusing light 12 receives the visible light from the miniature laser scanner 10 to project the generated image thereon to the holographic element 14. The holographic element produces a virtual image 18 from the generated image 16 by providing reflection at the frequency of the emitted light of the laser scanner to provide a reflected image to an interior of the vehicle.

Preferably, the holographic element 14 is configured to be disposed on a surface of a windshield of a vehicle, and the means for diffusing light is configured in the optical path to project an image from the laser scanner to the holographic element which operates to reflect the image to within the vehicle in a way to provide a virtual image at a predetermined distance ahead of the windshield. In this embodiment, the image source 10 is a miniature laser scanner that produces a raster scan of the image 16 in either an interlaced or progressive scan mode as is known in the art. In effect, the laser scanner writes the image to the diffuser element 12. The laser scanner contains electronics and miniature optical elements as are commonly known in the art for miniature laser scanners, and will not be described herein.

In one configuration, the diffuser element 12 has a dimensional extent of about fifteen centimeters of any shape including round or rectangular, and the holographic element 14 usually has a larger dimensional extent (i.e., the relation between the dimensions of the flat diffuser 12 placed horizontally and the flat hologram 14 is: $Area_{hol}=Area_{diff}/\cos(\alpha)$, where a is the angle of inclination of the windshield with respect to horizontal). The scanner 10 is located at a distance, N, of about twenty-four centimeters from the diffuser element 12. The diffuser 12 is plastic and is located at a distance, D, of about one hundred and fifty centimeters from the holographic element 14 to the windshield 20. A user is expected to be located within a range, V, of about sixty to ninety centimeters from the windshield and holographic element. Although the geometry shown shows the scanner, diffuser and holographic elements in a straight perpendicular configuration, it should be recognized that the optical path of these components can be angled or folded by many means, such as by including mirrors, and that these different configurations are encompassed by the present invention. The holographic element can be replaced by a metal diffraction grating or dielectric coating as are known in the art. However, holographic elements are preferred due to their ease of manufacture and application. The holographic element is previously configured, using techniques known in the art, to provide a diffractive function. In particular, the holographic element is configured to exhibit a diffractive reflectivity for a narrow band of frequencies about the known operating frequency of the laser scanner 10. As a result, the holographic element efficiently mirrors (reflects) the light from the diffuser 12 to a driver 22 of the vehicle, while being substantially transparent to light from the view ahead of the windshield. For optimum efficiency, the HUD is configured to project the wavefront from the diffuser 12 incident to the holographic element 14 in such a way that driver's eyes position 22 and the diffuser 12 position are related by the Bragg condition, B. In this embodiment, a virtual image 18 can be visualized at a distance, L, of about two-hundred centimeters ahead of the driver of the vehicle 22.

Preferably, the means to diffuse the light 12 is a diffusing element that provides optical gain for the image 16 thereon. For a better light uniformity, a Fresnel lens can be incorporated with the diffuser element. The higher the gain provided by the diffuser element, the smaller the exit cone of light from the diffuser element. In practice, gains of from two to one-hundred can be easily provided from the diffuser. Gains of about fifty to seventy times, along the perpendicular axis of the diffuser are preferred. The use of gain provides a much bright image along the optical path for the driver 22 of the vehicle.

In some applications, the first embodiment may have too large of an optical path to be conveniently located within a vehicle. This problem can be solved by configuring the holographic element 14 to provide a magnification for the image incident thereon. Magnifying holographic elements are known in the art and can be manufactured by, for example, exposing the film to an impinging a flat wavefront in conjunction with an impinging spherical wavefront, of a defined focal length. Subsequently, in playback, presenting a flat wavefront to the holographic element at a defined angle of incidence will re-construct the needed wavefront towards the driver 22.

Figure 3:
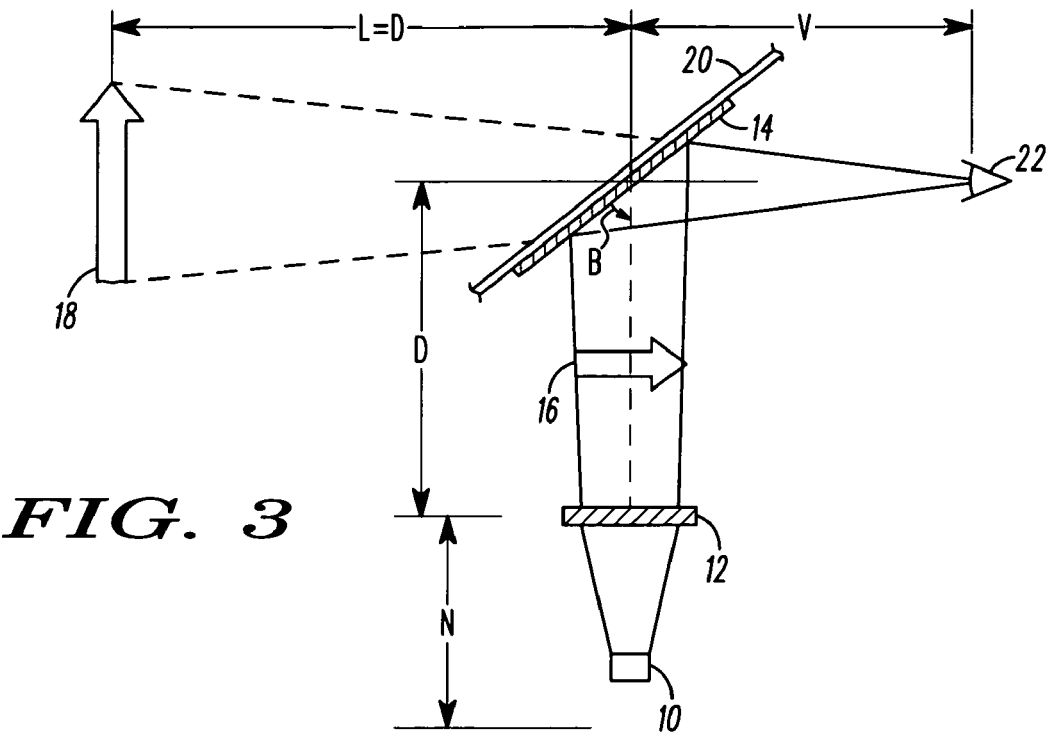
FIG. 3 is a cross sectional view of a third embodiment of a head-up display, in accordance with the present invention.

Referring to FIG. 3, a cross-sectional view of a third embodiment of a head-up display (HUD) is shown, in accordance with the present invention, having a shorter optical path than that of FIG. 2. In this embodiment, the display again includes an image source 10, a means for diffusing light 12, and a holographic element 14. The image source 10 emits a visible light for transmitting a generated image 16. The means for diffusing light 12 receives the visible light from the laser scanner 10 to project the transmitted generated image thereon to the holographic element 14. The holographic element produces a virtual image 18 from the transmitted generated image 16 by providing reflection at the frequency of the emitted light of the laser scanner to provide a reflected image to an interior of the vehicle.

Preferably, the holographic element 14 is configured to be disposed on a surface of a windshield of a vehicle, and the means for diffusing light is configured in the optical path to project an image from the laser scanner to the holographic element which operates to reflect the image to within the vehicle in a way to provide a virtual image at a predetermined distance ahead of the windshield. Again, the image source 10 is a miniature laser scanner that produces a raster scan of the image 16 in either an interlaced or progressive scan mode as is known in the art. In effect, the laser scanner writes the image to the diffuser element 12. The laser scanner contains electronics and miniature optical elements as are commonly known in the art for miniature laser scanners, and will not be described herein.

In practice, the diffuser element 12 again has a dimensional extent of about fifteen centimeters of any shape including round or rectangular, and the holographic element 14 usually has a larger dimensional extent (e.g., the relation between the dimensions of the flat diffuser 12 placed horizontally and the flat hologram 14 is: $Area_{hol} = Area_{diff}/\cos(\alpha)$, where $\alpha$ is the angle of inclination of the windshield with respect to horizontal). However, in this embodiment, the diffuser element 12 can be made of an even smaller dimensional extent of from seven to fifteen centimeters. Proportionately, the scanner 10 is located at a distance, N, that is from twelve to twenty-four centimeters, respectively, from the diffuser element 12. In addition, the diffuser 12 is located in a range, D, of about twenty to thirty-five centimeters from the holographic element 14 and windshield 20. A virtual image 18 can be visualized at a distance, L, of about two-hundred centimeters ahead of the driver 22, and a user is expected to be located within a range, V, of about sixty to ninety centimeters from the windshield and holographic element.

The shrinking of the optical path provided by this embodiment can be accomplished by providing the holographic element 14 with magnification for the image incident thereon. Magnifying holographic elements are known in the art and can be manufactured by exposing the film to an impinging a flat wavefront in conjunction with an impinging spherical wavefront, of a defined focal length. Subsequently, presenting a flat wavefront to the holographic element at a defined incidence angle will re-construct the needed wavefront towards the driver 22, with the hologram 14 having the defined focal length (i.e. magnification). In this instance, the focal length, $1/f$, of the optical path is equal to $1/D+1/L$. Although the geometry shown shows the scanner, diffuser and holographic elements in a straight perpendicular configuration, it should be recognized that the optical path of these components can be angled or folded by many means, such as by including reflective elements, and that these different configurations are encompassed by the present invention.

The holographic element can be replaced by a metal diffraction grating or dielectric coating as are known in the art. However, holographic elements are preferred due to their ease of manufacture to provide magnification and subsequent application. The holographic element is previously configured, using techniques known in the art, to provide a diffractive function along with a lensing function. In particular, the holographic element is configured to exhibit a diffractive reflectivity for a narrow band of frequencies about the known operating frequency of the laser scanner 10, along with spherical wavefront reconstruction. As a result, the holographic element efficiently mirrors (reflects) and magnifies the light from the laser scanner to a driver 22 of the vehicle, while being substantially transparent to light from the view ahead of the windshield. For optimum efficiency, the HUD is configured in such a way that driver's eyes position 22 and the diffuser 12 position are related by the Bragg condition for the holographic element 14, wherein B is Bragg angle.

Preferably, the means to diffuse the light 12 is a diffusing element that provides optical gain for the image 16 thereon. For a better light uniformity, a Fresnel lens can be incorporated with the diffuser element. The higher the gain provided by the diffuser element, the smaller the exit cone of light from the diffuser element. In practice, gains of from two to one-hundred can be easily provided from the diffuser. The use of gain provides a much bright image for the driver 22 of the vehicle. In addition, the diffuser element 12 presents a substantially flat wavefront to the holographic element 14 to reproduce a focusing (spherical) wavefront of the reconstructed beam to magnify the smaller image from the diffuser.

Figure 4:
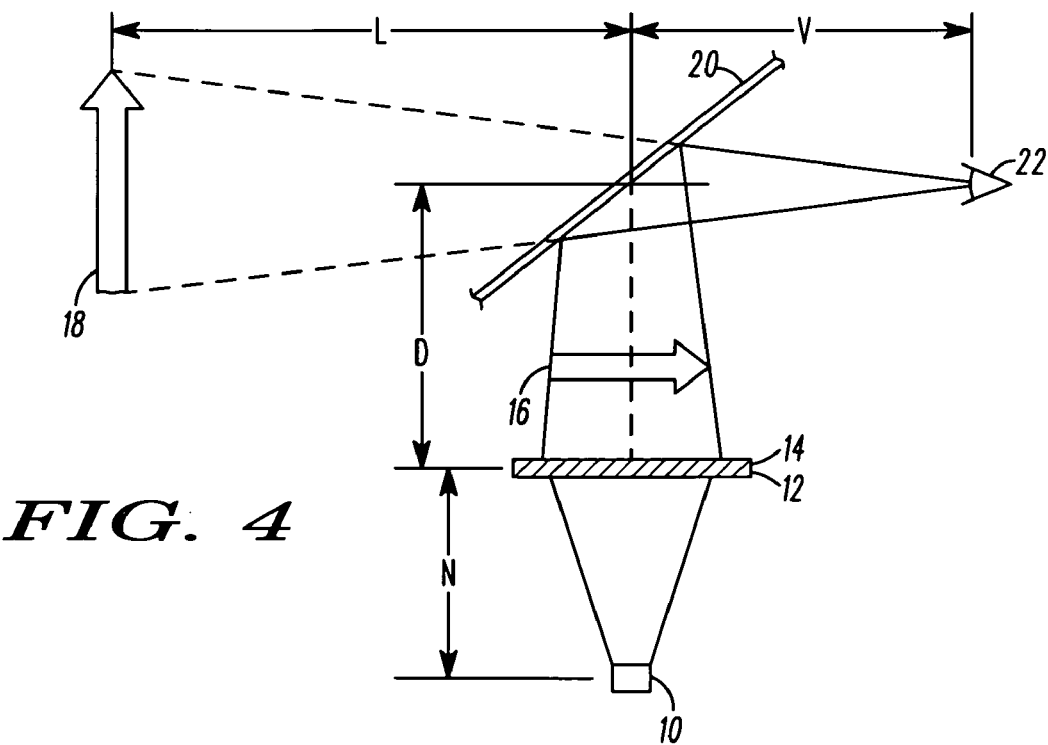
FIG. 4 is a cross sectional view of a preferred embodiment of a head-up display, in accordance with the present invention.

Referring to FIG. 4, a cross-sectional view of a fourth and preferred embodiment of a head-up display (HUD) is shown, in accordance with the present invention. In this embodiment, the display again includes an image source 10, a means for diffusing light 12, and a holographic element 14. However, in this instance the holographic element 14 incorporates the means for diffusing light within itself and is configured to be located below a windshield of a vehicle in the optical path. Techniques for providing combined diffusion and holographic elements are known in the art. In this way, the holographic element 14 projects an image from the image source 10 to the windshield 20 which operates to reflect the image to within the vehicle in a way to provide a virtual image 18 at a predetermined distance ahead of the windshield 20.

As in the other embodiments, the image source 10 is a miniature laser scanner that produces a raster scan of the image 16 in either an interlaced or progressive scan mode as is known in the art. In effect, the laser scanner writes the image to the combined diffuser and holographic element. The laser scanner contains electronics and miniature optical elements as are commonly known in the art for miniature laser scanners, and will not be described herein.

In practice, the combined holographic and diffuser element can be made of a smaller dimensional extent of from seven to fifteen centimeters. Proportionately, the scanner 10 is located at a distance, N, that is from twelve to twenty-four centimeters, respectively, from the combined holographic and diffuser element. In addition, the combined holographic and diffuser element is located in a range, D, of about twenty to thirty-five centimeters from the windshield 20. Again, a virtual image 18 can be visualized at a distance, L, of about two-hundred centimeters ahead of the driver 22, and a user is expected to be located within a range, V, of about sixty to ninety centimeters from the windshield and holographic element.

The small optical path provided by this embodiment is again accomplished by providing the combined holographic and diffuser element with magnification for the image incident thereon. Magnifying holographic elements are known in the art and can be manufactured by exposing the film to an impinging a flat wavefront in conjunction with an impinging spherical wavefront, of a defined focal length. Subsequently, presenting a flat wavefront to the holographic element at a defined incidence angle will re-construct the needed wavefront towards the driver 22. Although the geometry shown shows the scanner, diffuser and holographic elements in a straight perpendicular configuration, it should be recognized that the optical path of these components can be angled or folded by many means, such as by including reflecting elements, and that these different configurations are encompassed by the present invention.

The windshield can be left unmodified, making this embodiment universally applicable, and retrofittable, to all vehicles. Also, the windshield has no appliances disposed thereon, making the forward view completely unobstructed.

Preferably, the combined holographic and diffuser element also provides optical gain for the image 16 thereon. For a better light uniformity, a Fresnel lens can be incorporated with the holographic and diffuser element. The higher the gain provided, the smaller the exit cone of light from the diffuser element. In practice, gains of from two to one-hundred can be easily provided. The use of gain provides a much bright image for the driver 22 of the vehicle.

Figure 5:
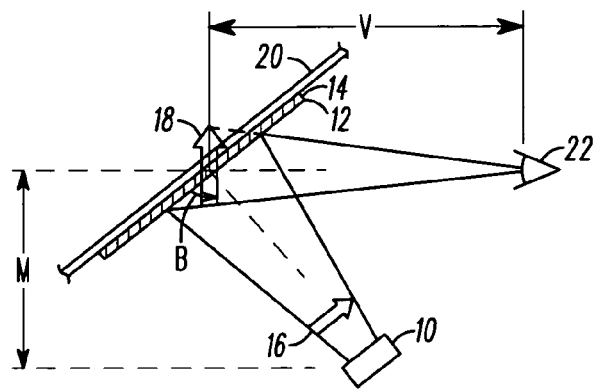
FIG. 5 is a cross sectional view of an alternate embodiment of a head-up display, in accordance with the present invention.

FIG. 5 shows an alternate embodiment of a head-up display (HUD), in accordance with the present invention. In this embodiment, the display again includes an image source 10 and a combined means for diffusing light 12 and a holographic element 14. In this instance the holographic element 14 incorporates the means for diffusing light within itself and is configured to be disposed on an interior surface of a windshield of a vehicle in the optical path. Techniques for providing combined diffusion and holographic elements are known in the art. In this way, the holographic element 14 provides reflection (diffraction) at the frequency of the emitted light of the laser scanner to provide a reflected image to an interior of the vehicle while transmitting light of other frequencies therethrough. However, the reflection in this embodiment does not provide a virtual image 18 at a predetermined distance ahead of the windshield 20, but instead provides a simple reflected image 18 either directly on or in the immediate vicinity of the windshield. As shown, this embodiment provides the simplest structure and smallest size for the HUD.

As in the other embodiments, the image source 10 is a miniature laser scanner that produces a raster scan of the image 16 in either an interlaced or progressive scan mode as is known in the art. In effect, the laser scanner writes the image to the combined diffuser and holographic element. The laser scanner contains electronics and miniature optical elements as are commonly known in the art for miniature laser scanners, and will not be described herein.

In practice, the combined holographic and diffuser element are made having a dimensional extent of from about fifteen centimeters (this extent depends on a particular angular orientation of the laser scanner 10 with respect to the plane of windshield 20), being either round or rectangular. Proportionately, the scanner 10 is located at a distance, M, that is about twenty-four centimeters from the combined holographic and diffuser element. The image 18 of up to fifteen centimeters in size can be visualized, on the windshield 20, and a user is expected to be located within a range, V, of about sixty to ninety centimeters from the windshield and holographic element.

The small optical path provided by this embodiment is again accomplished by providing the combined holographic and diffuser element with magnification for the image incident thereon. Magnifying holographic elements are known in the art and can be manufactured by exposing the film to an impinging a flat wavefront in conjunction with an impinging spherical wavefront, of a defined focal length. Subsequently, presenting a flat wavefront at a defined incidence angle to the holographic element will re-construct the needed wavefront towards the driver 22. It should be recognized that the optical path of these components can be angled or folded by many means, such as by including reflecting elements, and that these different configurations are encompassed by the present invention.

The holographic element can be replaced by a metal diffraction grating or dielectric coating as are known in the art. However, holographic elements are preferred due to their ease of manufacture to provide magnification and subsequent application. The holographic element is previously configured, using techniques known in the art, to provide a diffractive function along with a lensing function. In particular, the holographic element is configured to exhibit a diffractive reflectivity for a narrow band of frequencies about the known operating frequency of the laser scanner 10, along with spherical wavefront reconstruction. As a result, the holographic element efficiently mirrors (reflects) and magnifies the light from the laser scanner to a driver 22 of the vehicle, while allowing light of other frequencies to pass through the windshield. For optimum efficiency, the HUD is configured to project the wavefront from the scanner 10 incident to the combined holographic and diffuser element and windshield 20 at a Bragg angle, B, of the holographic element.

Preferably, the combined holographic and diffuser element also provides optical gain for the image 16 thereon. The higher the gain provided, the smaller the exit cone of light from the diffuser element. In practice, gains of from two to one-hundred can be easily provided. The use of gain provides a much bright image for the driver 22 of the vehicle.

Figure 6:
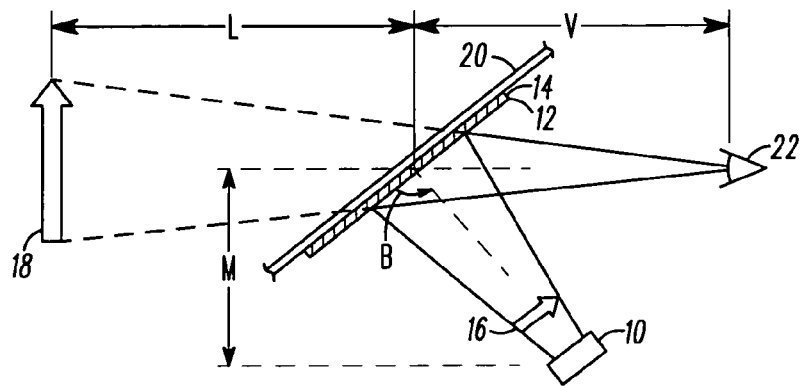
FIG. 6 is a cross sectional view of a second alternate embodiment of a head-up display, in accordance with the present invention.

FIG. 6 shows a second alternate embodiment of a head-up display (HUD), in accordance with the present invention. In this embodiment, the display again includes an image source 10 and a combined means for diffusing light 12 and a holographic element 14. In this instance the holographic element 14 incorporates the means for diffusing light within itself and is configured to be disposed on an interior surface of a windshield of a vehicle in the optical path. Techniques for providing combined diffusion and holographic elements are known in the art. In this way, the holographic element 14 provides reflection (diffraction) at the frequency of the emitted light of the laser scanner to provide a reflected image to an interior of the vehicle while transmitting light of other frequencies therethrough. However, this alternative embodiment provides a virtual image 18 at a predetermined distance ahead of the windshield 20. As shown, this embodiment provides the simplest structure and smallest size for the HUD.

As in the other embodiments, the image source 10 is a miniature laser scanner that produces a raster scan of the image 16 in either an interlaced or progressive scan mode as is known in the art. In effect, the laser scanner writes the image to the combined diffuser and holographic element. The laser scanner contains electronics and miniature optical elements as are commonly known in the art for miniature laser scanners, and will not be described herein.

In practice, the combined holographic and diffuser element are made of a smaller dimensional extent of from about seven to fifteen centimeters (this extent also depends on a particular angular orientation of the laser scanner 10 with respect to the plane of windshield 20), being either round or rectangular. Proportionately, the scanner 10 is located at a distance, M, that is from twelve to twenty-four centimeters from the combined holographic and diffuser element. The virtual image 18 can be visualized at a distance, L, ahead of the driver 22, and a user is expected to be located within a range, V, of about sixty to ninety centimeters from the windshield and holographic element.

The small optical path provided by this embodiment is again accomplished by providing the combined holographic and diffuser element with magnification for the image incident thereon. Magnifying holographic elements are known in the art and can be manufactured by exposing the film to an impinging a flat wavefront in conjunction with an impinging spherical wavefront, of a defined focal length. Subsequently, presenting a flat wavefront at a defined incidence angle to the holographic element will re-construct the needed wavefront towards the driver 22. It should be recognized that the optical path of these components can be angled or folded by many means, such as by including reflecting elements, and that these different configurations are encompassed by the present invention.

The holographic element is previously configured, using techniques known in the art, to provide a diffractive function along with a lensing function. In particular, the holographic element is configured to exhibit a diffractive reflectivity for a narrow band of frequencies about the known operating frequency of the laser scanner 10, along with spherical wavefront reconstruction. As a result, the holographic element efficiently mirrors (reflects) and magnifies the light from the laser scanner to a driver 22 of the vehicle, while allowing light of other frequencies to pass through the windshield. For optimum efficiency, the HUD is configured to project the wavefront from the scanner 10 incident to the combined holographic and diffuser element and windshield 20 at a Bragg angle, B, of the holographic element.

Preferably, the combined holographic and diffuser element also provides optical gain for the image 16 thereon. The higher the gain provided, the smaller the exit cone of light from the diffuser element. In practice, gains of from two to one-hundred can be easily provided. The use of gain provides a much bright image for the driver 22 of the vehicle.

In the embodiments of FIGS. 1–6, it is possible to provide a non-flat diffuser element 12. In other words, that laser scanning can be brought about not only on a flat surface but also onto a curved one. Specifically, a surface shape of the plastic diffuser can be configured in such a way that the aberrations introduced by a curved windshield, or other distortions in the optical path, will be eliminated. Advantageously, this feature can eliminate the need for additional optics in the optical path such as a curved mirror, for example, to compensate for the distorting curvature of a windshield. In the present invention, the plastic diffuser 12, with or without a Fresnel lens, can be configured into a curved shape (e.g. convex, concave, or general asphere) in a way to play the same role as a curved mirror, which would then not be required.

In all of the above embodiments, depending on properties of the diffusing element and the holographic element, a mutual orientation of laser scanner and the diffusing element should be optimized for maximum brightness towards the viewer.

In addition, in all of the above embodiments, the laser scanner can be configured to pre-distort the generated image to compensate for distortions caused throughout the optical path. This can be used in conjunction with the curved diffuser element described above. In particular, the laser scanner can be configured to provide image distortions within a certain range so that the process to compensate for aberrations introduced by a curved windshield is significantly simplified, so that an HUD designer can experimentally observe the distortion of the image generated by the laser scanner using the real windshield while varying the value of the introduced distortion. Thus, an HUD compensation technique is provided to easily accommodate a given HUD design to various vehicle models, including those with varying types of windshields.

Figure 7:
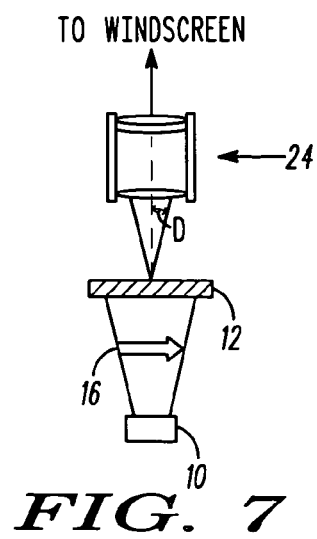
FIG. 7 is a cross sectional view of additional optical elements that can be used in conjunction with any of the embodiments of FIGS. 1–6.

Moreover, it should be recognized that the HUD of the present invention can further comprise optional optical elements as shown in FIG. 7, such as lenses and reflective elements for example, disposed in the optical path after the means for diffusing light, wherein an exit cone of light from the means for diffusing light is substantially captured by an acceptance angle of the optical elements. The optional optical elements can be used to further shorten the optical path and/or to fold the optical path to take up less volume in the vehicle.

In summary, by applying the above-described approach a significant improvement in the efficiency, brightness, and viewing angle of a head-up display image can be achieved. Depending on the value of gain of the diffuser 12, a viewing cone of about five to ten degrees can be provided, which is comfortable enough for an automobile driver. Further, the use of a diffusing element with gain can eliminate then need to use any extra optics in the optical path of the display. In addition, the use of a miniature laser scanner with a diffuser can provide for easy scaling of the image which can improve the field of view of the HUD. Moreover, the display of the present invention is much more compact than presently available HUD systems. It should be recognized that the present invention can find application for other than automotive environment, such as aircraft and watercraft, and that these applications are incorporated within the present invention.

While specific components and functions of the present invention are described above, fewer or additional functions could be employed by one skilled in the art and be within the broad scope of the present invention. The invention should be limited only by the appended claims.

What is claimed is:

1. A head-up display containing a plurality of elements optically coupled along an optical path, the display comprising:
    an image source that emits a visible light for generating an image;
    a means for diffusing light that receives the visible light from the image source to project the transmitted generated image thereon, the means for diffusing light including a lens for passing the image through the lens and providing optical gain for the image; and
    a holographic element that receives and magnifies the generated image from the means for diffusing light for producing a virtual image therefrom.

2. The display of claim 1, wherein the means for diffusing light provides adjustable gain for the image thereon.

3. The display of claim 1, wherein the holographic element configured to be disposed on a windshield of a vehicle, and wherein the means for diffusing light is configured in the optical path to project an image from the image source to the holographic element which operates to reflect the image to within the vehicle in a way to provide a virtual image at a predetermined distance ahead of the windshield.

4. The display of claim 3, wherein the means for diffusing light a driver's viewing angle are related by the Bragg condition for the holographic element.

5. The display of claim 1, wherein the holographic element incorporates the means for diffusing light and is configured to be located below a windshield of a vehicle in the optical path to project an image from the laser scanner to the windshield which operates to reflect the image to within the vehicle in a way to provide a virtual image at a predetermined distance ahead of the windshield.

6. The display of claim 1, wherein the holographic element incorporates the means for diffusing light and is configured to be disposed on a surface of a windshield of a vehicle, and wherein the holographic element provides reflection at the frequency of the emitted light of the laser scanner to provide a reflected image to an interior of the vehicle.

7. The display of claim 1, further comprising optical elements disposed in the optical path after the means for diffusing light, wherein an exit cone of light from the means for diffusing light is substantially captured by an acceptance angle of the optical elements.

8. The display of claim 1, wherein the laser scanner is configured to pre-distort the generated image to compensate for distortions in the optical path.

9. The display of claim 1, wherein the means for diffusing light is configured in a non-flat shape to compensate for aberrations in the optical path.

10. A head-up display for a vehicle containing a plurality of elements optically coupled along an optical path, the display comprising:
  a laser scanner that emits a raster scan of visible light to generate an image;
  a means for diffusing light placed in an intermediate plane of the optical path that receives the visible light from the laser scanner to project and apply adjustable gain to the image generated thereon, the means for diffusing light including a lens for passing the image through the lens and providing optical gain for the image; and
  a holographic element for producing a virtual image from the generated image,
  the head-up display being operable to project the image to a driver within the vehicle using a windshield of a vehicle in a way to provide a virtual image at a predetermined distance ahead of the windshield.

11. The display of claim 10, wherein the holographic element is configured to be disposed on a windshield of a vehicle, the holographic element configured to reflect light at the frequency of the light from the laser scanner, and wherein the means for diffusing light is configured in the optical path to project an image from the laser scanner to the holographic element which operates to reflect the image to within the vehicle in a way to provide a virtual image at a predetermined distance ahead of the windshield.

12. The display of claim 11, wherein the holographic element provides magnification for the image thereon so as to reduce a length of the optical path.

13. The display of claim 10, wherein the holographic element incorporates the means for diffusing light and is configured to be located below a windshield of a vehicle in the optical path to magnify and project an image from the laser scanner to the windshield which operates to reflect the image to within the vehicle in a way to provide a virtual image at a predetermined distance ahead of the windshield.

14. The display of claim 10, wherein the holographic element incorporates the means for diffusing light and is configured to be disposed on a surface of a windshield of a vehicle, and wherein the holographic element provides reflection at the frequency of the emitted light of the laser scanner to provide a reflected image to an interior of the vehicle while transmitting light of other frequencies therethrough.

15. The display of claim 10, further comprising optical elements disposed in the optical path after the means for diffusing light, wherein an exit cone of tight from the means for diffusing light is substantially captured by an acceptance angle of the optical elements that follow in the optical path.

16. The display of claim 10, wherein the laser scanner is configured to pre-distort the transmitted image to compensate for distortions caused throughout the optical path.

17. A head-up display containing a plurality of elements optically coupled along an optical path for operation using a windshield of a vehicle, the display comprising:
  a laser scanner that emits a raster scan of visible light to generate an image;
  a means for diffusing light placed in an intermediate plane of the optical path that receives the visible light from the laser scanner to project and apply an adjustable gain to the transmitted generated image thereon, the means for diffusing light including a lens for passing the image through the lens and providing optical gain for the image; and
  a holographic element placed between the laser scanner and a driver of the vehicle, the holographic element receiving and magnifying the image to produce a virtual image therefrom,
  the head-up display being operable to project the image to a driver within the vehicle using a windshield of a vehicle in a way to provide a virtual image at a predetermined distance ahead of the windshield.

18. The display of claim 17, wherein the holographic element is configured to be disposed on a windshield of a vehicle, the holographic element configured to reflect light at the frequency of the light from the scanner, and wherein the means for diffusing light is configured in the optical path to project an image from the laser scanner to the holographic element which operates to reflect the image to within the vehicle in a way to provide a virtual image at a predetermined distance ahead of the windshield.

19. The display of claim 17, wherein the holographic element incorporates the means for diffusing light and is configured to be located below a windshield of a vehicle in the optical path to magnify and project an image from the laser scanner to the windshield which operates to reflect the image to within the vehicle in a way to provide a virtual image at a predetermined distance ahead of the windshield.

* * * * *